United States Patent
Fleishman et al.

(10) Patent No.: US 9,939,914 B2
(45) Date of Patent: *Apr. 10, 2018

(54) SYSTEM AND METHOD FOR COMBINING THREE-DIMENSIONAL TRACKING WITH A THREE-DIMENSIONAL DISPLAY FOR A USER INTERFACE

(71) Applicant: Intel Corporation, Santa Clara, CA (US)

(72) Inventors: Shahar Fleishman, Hod Hasharon (IL); Gershom Kutliroff, Alon Shvut (IL); Yaron Yanai, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,136

(22) Filed: Oct. 19, 2016

(65) Prior Publication Data
US 2017/0038850 A1 Feb. 9, 2017

Related U.S. Application Data

(63) Continuation of application No. 13/857,009, filed on Apr. 4, 2013, now Pat. No. 9,477,303.
(Continued)

(51) Int. Cl.
| | | |
|---|---|---|
| *G06T 19/00* | (2011.01) | |
| *G06F 3/01* | (2006.01) | |
| *G06F 3/00* | (2006.01) | |
| *G06K 9/00* | (2006.01) | |
| *G06T 13/40* | (2011.01) | |
| *G06T 17/00* | (2006.01) | |
| *G06F 3/0481* | (2013.01) | |

(Continued)

(52) U.S. Cl.
CPC .............. *G06F 3/017* (2013.01); *G06F 3/005* (2013.01); *G06F 3/011* (2013.01); *G06K 9/00355* (2013.01); *G06T 13/40* (2013.01); *G06T 17/00* (2013.01); *G06T 19/006* (2013.01); *G06F 3/04815* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 2010/0241998 A1* | 9/2010 | Latta | ........................ | G06F 3/011 715/862 |
| 2010/0302015 A1* | 12/2010 | Kipman | .................. | G06F 3/011 340/407.1 |

(Continued)

*Primary Examiner* — Nicholas R Wilson
(74) *Attorney, Agent, or Firm* — Womble Bond Dickinson (US) LLP

(57) ABSTRACT

Systems and methods for combining three-dimensional tracking of a user's movements with a three-dimensional user interface display is described. A tracking module processes depth data of a user performing movements, for example, movements of the user's hands and fingers. The tracked movements are used to animate a representation of the hand and fingers, and the animated representation is displayed to the user using three-dimensional display. Also displayed are one or more virtual objects with which the user can interact. In some embodiments, the interaction of the user with the virtual objects controls an electronic device.

17 Claims, 12 Drawing Sheets

Related U.S. Application Data

(60) Provisional application No. 61/621,957, filed on Apr. 9, 2012.

(51) Int. Cl.
  *G06F 3/0484* (2013.01)
  *G06F 3/0488* (2013.01)

(56) References Cited

U.S. PATENT DOCUMENTS

| | | | | |
|---|---|---|---|---|
| 2011/0317871 A1* | 12/2011 | Tossell | ............... | G06K 9/00369 382/103 |
| 2013/0088413 A1* | 4/2013 | Raffle | ................ | G02B 27/0101 345/7 |

* cited by examiner

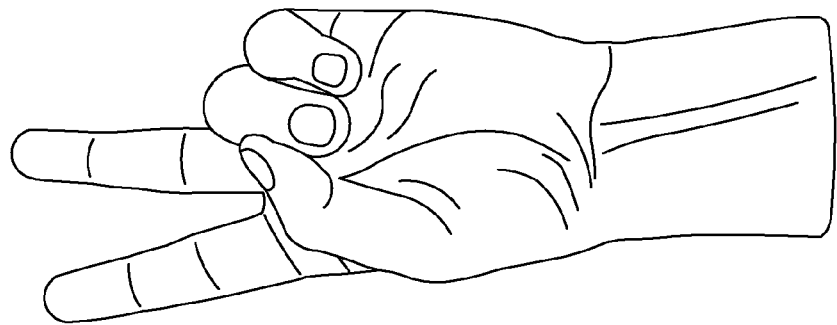
FIG. 6F
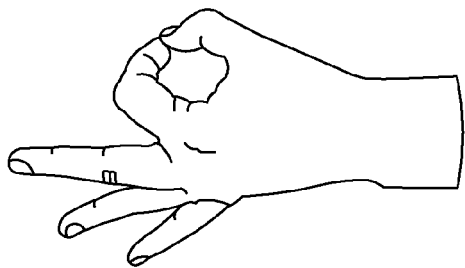
FIG. 6D
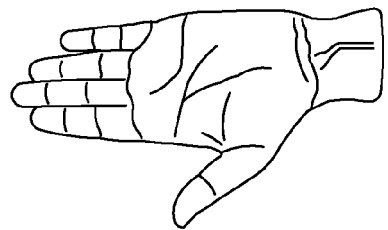
FIG. 6E
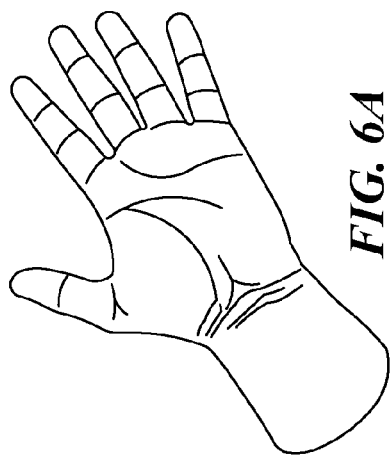
FIG. 6A
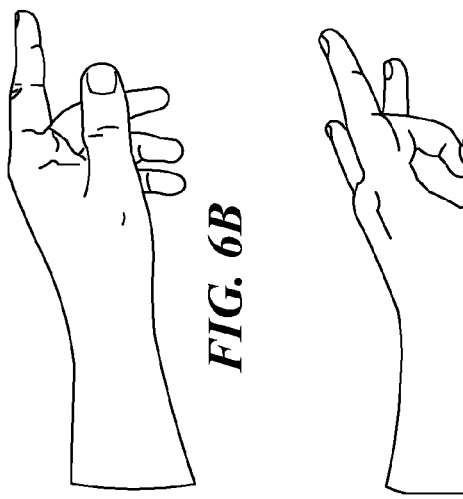
FIG. 6B
FIG. 6C

SYSTEM AND METHOD FOR COMBINING THREE-DIMENSIONAL TRACKING WITH A THREE-DIMENSIONAL DISPLAY FOR A USER INTERFACE

CROSS-REFERENCE TO RELATED APPLICATIONS

This application is a continuation of U.S. patent application Ser. No. 13/857,009, filed Apr. 4, 2013, which claims priority from U.S. Provisional Patent Application No. 61/621,957, filed Apr. 9, 2012, the contents of which are hereby incorporated by reference herein.

BACKGROUND

Typically, humans physically manipulate controls, press buttons, or touch screens to interact with electronic devices, such as computers, tablets, and mobile phones. For example, users interact with computers via input devices, such as a keyboard and mouse. While a keyboard and mouse are effective devices for performing functions such as entering text and scrolling through documents, they are not effective for many other ways in which a user could interact with an electronic device. A user's hand holding a mouse is constrained to move only along flat two-dimensional (2D) surfaces, and navigating with a mouse through three dimensional virtual spaces is clumsy and non-intuitive. Similarly, the flat interface of a touch screen does not allow a user to convey any notion of depth.

BRIEF DESCRIPTION OF THE DRAWINGS

Examples of a user interface system that combines three-dimensional tracking with a three-dimensional display are illustrated in the figures. The examples and figures are illustrative rather than limiting.

FIGS. 6A-6F show graphic illustrations of examples of hand gestures that may be tracked. FIG. 6A shows an upturned open hand with the fingers spread apart; FIG. 6B shows a hand with the index finger pointing outwards parallel to the thumb and the other fingers pulled toward the palm; FIG. 6C shows a hand with the thumb and middle finger forming a circle with the other fingers outstretched; FIG. 6D shows a hand with the thumb and index finger forming a circle and the other fingers outstretched; FIG. 6E shows an open hand with the fingers touching and pointing upward; and FIG. 6F shows the index finger and middle finger spread apart and pointing upwards with the ring finger and pinky finger curled toward the palm and the thumb touching the ring finger.

FIG. 7A shows a dynamic wave-like gesture; FIG. 7B shows a loosely-closed hand gesture; FIG. 7C shows a hand gesture with the thumb and forefinger touching; and FIG. 7D shows a dynamic swiping gesture.

DETAILED DESCRIPTION

Figure 1:
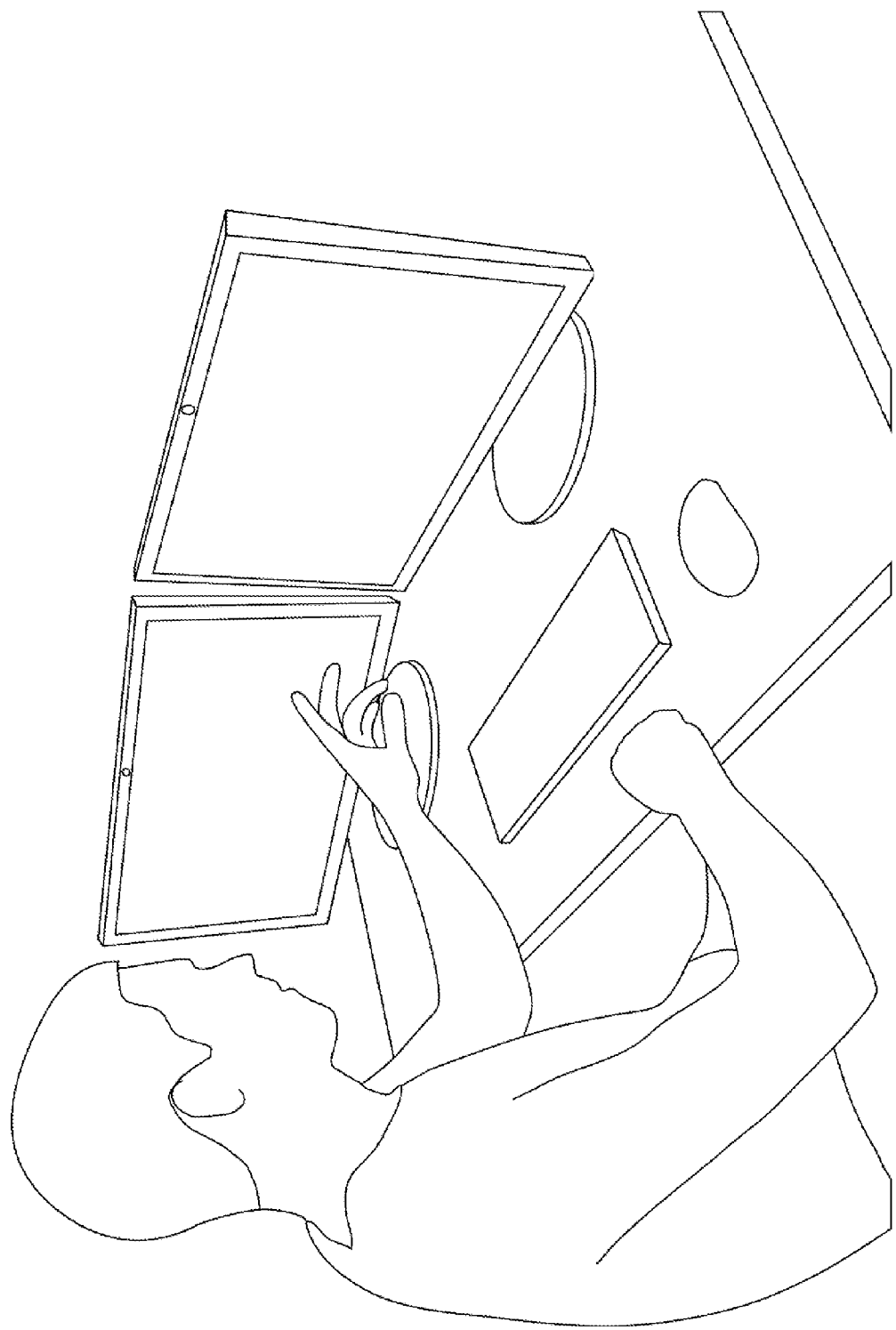
FIG. 1 is a diagram illustrating an example environment in which a user interacts with one or more monitors.

Systems and methods for combining three-dimensional tracking of a user's movements with a three-dimensional user interface display are described. A tracking module processes depth data of a user performing movements, for example, movements of the user's hand and fingers. The tracked movements are used to animate a representation of the hand and fingers, and the animated representation is displayed to the user using a three-dimensional display. Also displayed are one or more virtual objects with which the user can interact. In some embodiments, the interaction of the user with the virtual objects controls an electronic device.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

While we live in a three-dimensional (3D) world, our interactions with conventional electronic devices are, for the most part, two-dimensional (2D) interactions. Enabling users to interact freely in 3D space with an electronic device can enrich the user experience by providing a larger, less restrictive, interaction area which is not limited by a physical device. Moreover, this type of system allows for a user interface that is both more intuitive and more natural, since user 30 interactions more closely reflect how people interact with objects in the real world. The extension of user interfaces to enable 30 interactions is predicated on two capabilities—the ability to interpret the user's movements in 30 without restricting the user's movements to a physical device, and the ability to display 30 information to the user.

A user interface system, therefore, can have two basic components. The first component displays information to the user, for example, a display screen, such as a flat panel display, or an image projected onto a vertical, flat wall. The display component shows the user a collection of graphical (or other) elements with which the user may interact.

The second component of the user interface system interprets the user's intentions in relation to the information presented to the user by the display component. For example, a tablet may display information to the user on a flat panel display screen, and then interpret the user's intentions by detecting where the user's fingers touch the screen relative to the displayed information. Generally, the user's actions have an immediate effect on the displayed information, thus providing the user feedback that indicates how the user's actions were interpreted by the application running the user interface system on the electronic device with which the user is interacting.

In the particular case of depth camera-based tracking of the user's hands and fingers, there is an additional dimension in which the user may move that is not available to the user of a touch screen device: depth, or the distance between the user's hands/fingers and the items with which the user is interacting. That is, the user may move his hands freely in space—in any of the available three dimensions. Using data generated by depth cameras, the positions of the user's hand joints may be robustly and accurately tracked, and provided as input to the application. In addition to tracking the user's hands and fingers, data from the camera may also be used to track other parts of the user's body, such as the location and orientation of the user's head. Because of the availability of highly accurate, robust data describing the real-time movements of the user's hands, fingers, and head (among other body parts), a two-dimensional (20) display is an insufficient medium with which to present the user with visual cues and feedback.

The current disclosure describes a system in which a depth camera is combined with a tracking module and a three-dimensional (30) display. The tracking module interprets the data from the depth camera to track the user's hands and fingers and interpret the poses of the user's hands and fingers, while the 30 display provides feedback to the user.

The advantage of a 30 display, in contrast to a 20 display, is that the virtual cues and feedback presented to the user are more consistent with the user's perception of space. That is, the three-dimensional freedom of movement of the user's hands and fingers is mirrored by the 30 virtual space with which the user is interacting. The similar dimensionality between the 30 interaction space and the 30 display space provides the user with a more consistent and intuitive experience. The present disclosure describes techniques to integrate the 30 interactive space and the 30 display space to provide the user with a smooth, intuitive, and natural way to interact with a device.

A depth camera may contain a depth image sensor, an optical lens, and an illumination source, among other components. The depth image sensor may rely on one of several different sensor technologies. Among these sensor technologies are time-of-flight, known as "TOF", (including scanning TOF or array TOF), structured light, laser speckle pattern technology, stereoscopic cameras, active stereoscopic sensors, and shape-from-shading technology. Most of these techniques rely on active sensors that supply their own illumination source. In contrast, passive sensor techniques, such as stereoscopic cameras, do not supply their own illumination source, but depend instead on ambient environmental lighting. In addition to depth data, the cameras may also generate color ("RGB") data, in the same way that conventional color cameras do, and the color data can be combined with the depth data for processing.

The data generated by depth cameras has several advantages over that generated by RGB cameras. In particular, the depth data greatly simplifies the problem of segmenting the background of a scene from objects in the foreground, is generally robust to changes in lighting conditions, and can be used effectively to interpret occlusions. Using depth cameras, it is possible to identify and track both the user's hands and fingers in real-time, even complex hand configurations. Moreover, the present disclosure describes methods to project the graphical elements onto a display surface such that they are sharp and not distorted, and these methods may rely on the distance measurements generated by the depth camera, between the camera and objects in the camera's field-of-view.

U.S. patent application Ser. No. 13/532,609, entitled "System and Method for Close-Range Movement Tracking," filed Jun. 25, 2012, describes a method for tracking a user's hands and fingers based on depth images captured from a depth camera, and using the tracked data to control a user's interaction with devices, and is hereby incorporated in its entirety. U.S. patent application Ser. No. 13/441,271, entitled "System and Method for Enhanced Object Tracking", filed Apr. 6, 2012, describes a method of identifying and tracking a user's body part or parts using a combination of depth data and amplitude (or infrared image) data, and is hereby incorporated in its entirety in the present disclosure. U.S. patent application Ser. No. 13/676,017, entitled "System and Method for User Interaction and Control of Electronic Devices", filed Nov. 13, 2012, describes a method of user interaction for controlling electronic devices and is based on depth cameras with electronic devices, and is hereby incorporated in its entirety.

A 30 display is a display that conveys depth perception to the user. Different technologies may be used to create the perception of depth. For example, stereoscopy is a technique that relies on presenting different images to each of the eyes of the observer, where the images are slightly offset from each other. The human visual system tends to interpret the offset images as a unified, 30 scene. The user may be required to wear special glasses to strengthen the user's perception of the 30 effect of the scene. Holography is another technique that may be used to create the perception of depth for the user. A hologram is a reconstruction of a light field created by scattering light from a light source off of objects. A head-mounted display ("HMO") may also be used to provide a scene perceived to be three-dimensional by the user. Other techniques that create images that are perceived to be three-dimensional may also be used. Several scenarios where one or more users interact within a three-dimensional space with a three-dimensional display are described below.

FIG. 1 is a diagram illustrating an example environment in which a user interacts with two monitors at close-range. In some embodiments, there may be a depth camera on each of the two monitors. In some embodiments, there may be only a single monitor with a depth camera. The user, through movements of the hands and fingers, interacts with the screens. The depth camera captures live video of the movements, and algorithms are applied to interpret the user's movements and determine the user's intentions. The screens in front of the user may be 30-enabled, so the user may perceive objects in 30 space. These 30-enabled screens provide feedback to the user, so as to enable the user to have a fluid interaction with the application.

Figure 2:
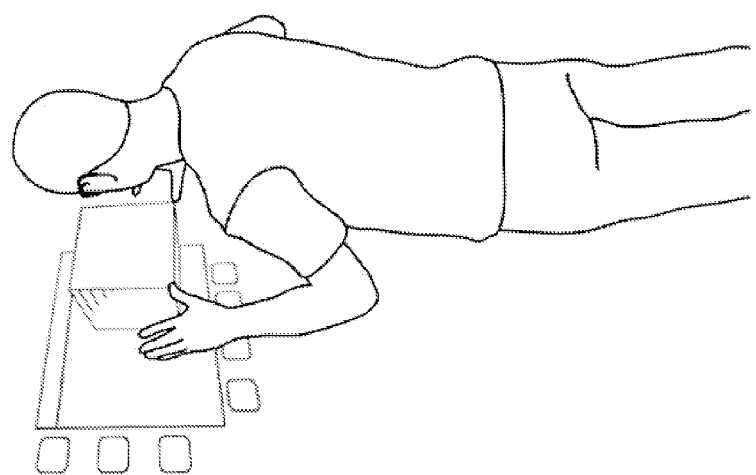
FIG. 2 is a diagram illustrating an example environment of a user interacting with a three-dimensional screen.

FIG. 2 is a diagram illustrating an example environment in which a user interacts with a 30 display screen. The user is wearing glasses that allow each eye to perceive different elements of the image, to create the effect of a 30 scene. The user also uses hands and fingers to interact with elements of the 30 image. A depth camera, in combination with a tracking algorithms module, tracks the positions of the joints of the user's hands, so that the user's movements can drive interaction with the application.

Figure 3:
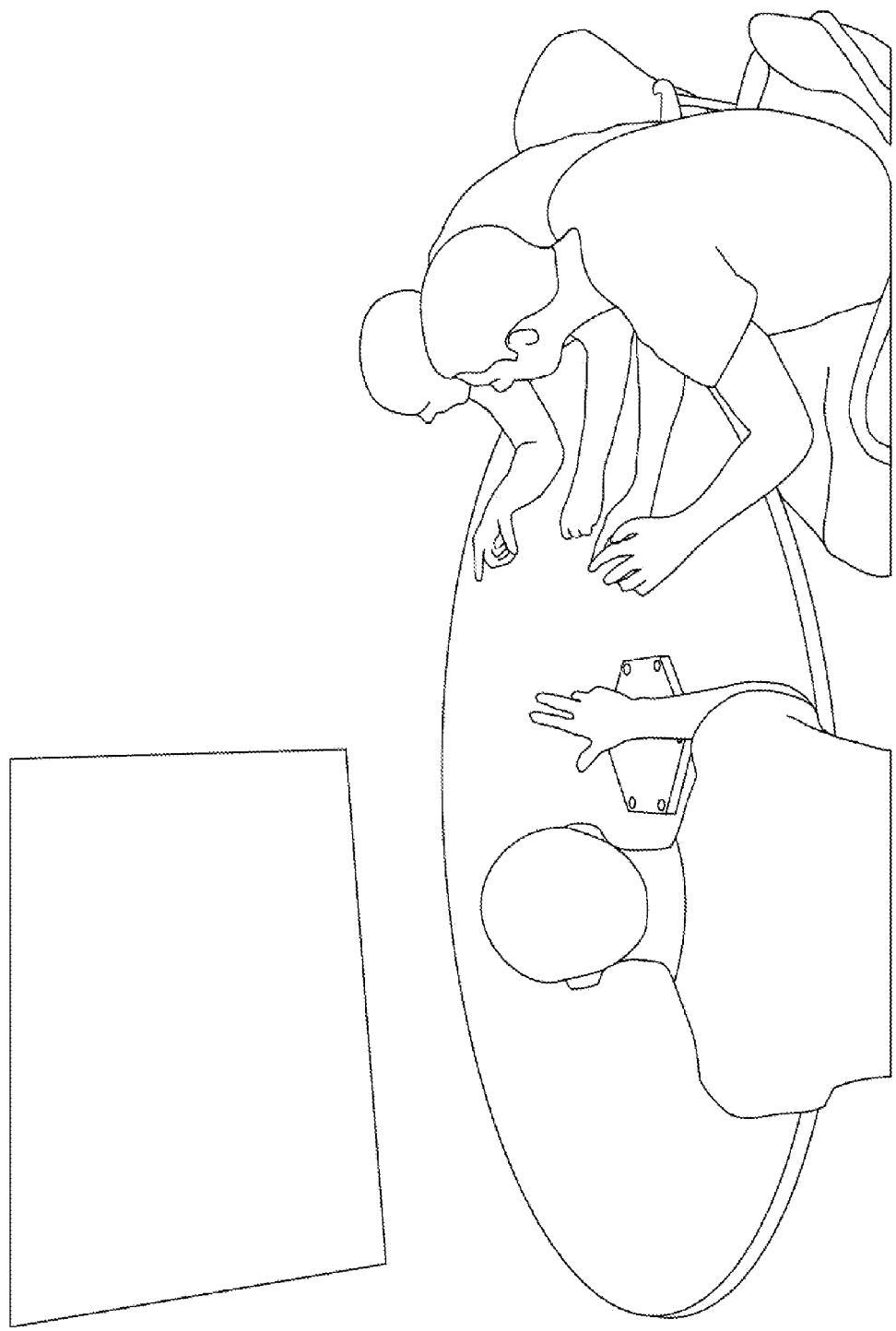
FIG. 3 is a diagram illustrating an example environment in which a standalone device using one or more depth cameras is used to capture user interactions and feedback is provided via a three-dimensional enabled screen.

FIG. 3 is a diagram illustrating an example environment of another application of the present disclosure. In this embodiment, a standalone device may contain a single depth camera, or multiple depth cameras, positioned around the periphery of the device. Individuals may then interact with their environment via the movements of their hands and fingers, which are detected by the camera and interpreted by the tracking algorithms. The screen in front of the users may be 30-enabled, so users may perceive objects in 30 space. The 30-enabled screen provides feedback to the users, so as to enable the users to have fluid interactions with the application.

Figure 4:
FIG. 4 is a diagram illustrating an example environment in which multiple users interact simultaneously with an application designed to be part of an installation.

FIG. 4 is a diagram illustrating an example environment of another application of the present disclosure, in which multiple users interact simultaneously with an application designed to be part of an installation. The movements of the users' hands and fingers control their virtual environment, via a depth camera that captures live video of their movements, and tracking algorithms that interpret the video to determine the users' intentions from their movements. The screen in front of the users may be 30-enabled, so users may perceive objects in 30 space. The 30-enabled screen provides feedback to the users, so as to enable the users to have fluid interactions with the application.

Figure 5:
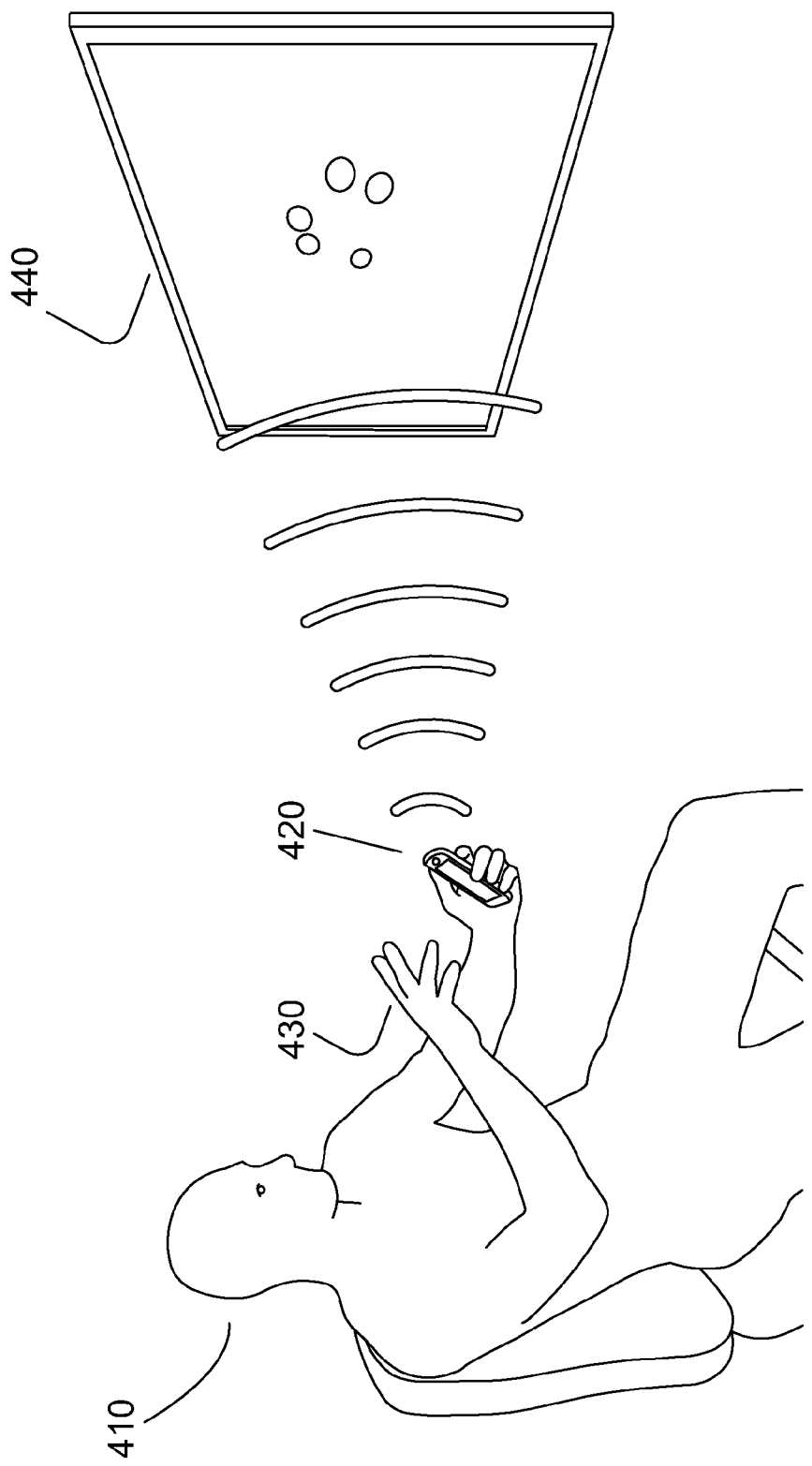
FIG. 5 is a diagram illustrating control of an example remote device through tracking of a user's hands and/or fingers.

FIG. 5 is a diagram of a still further example of an application of the present disclosure, in which a user 410 moves hands and fingers 430 while holding a handheld device 420 containing a depth camera. The depth camera captures live video of the movements and tracking algorithms are run on the video to interpret the user's movements. Further processing translates the user's hand/finger movements into gestures, which are used to control the large screen 440 which the user is watching. The screen in front of the user may be 30-enabled, so the user may perceive objects in 30 space. The 30-enabled screen provides feedback to the user, so as to enable the user to have a fluid interaction with the application.

FIGS. 6A-6F show graphic illustrations of examples of hand gestures that may be tracked. FIG. 6A shows an upturned open hand with the fingers spread apart; FIG. 6B shows a hand with the index finger pointing outwards parallel to the thumb and the other fingers pulled toward the palm; FIG. 6C shows a hand with the thumb and middle finger forming a circle with the other fingers outstretched; FIG. 6D shows a hand with the thumb and index finger forming a circle and the other fingers outstretched; FIG. 6E shows an open hand with the fingers touching and pointing upward; and FIG. 6F shows the index finger and middle finger spread apart and pointing upwards with the ring finger and pinky finger curled toward the palm and the thumb touching the ring finger.

Figure 7A:
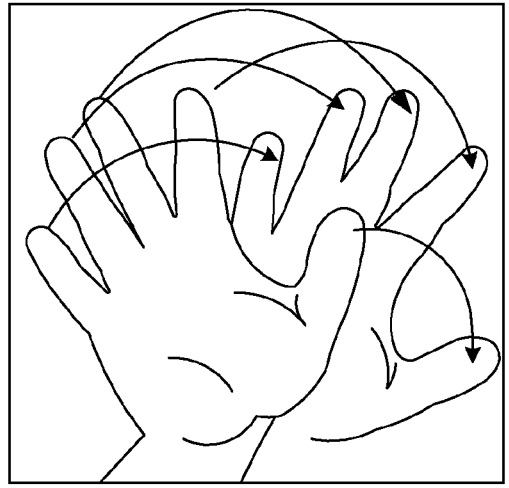
FIGS. 7A-7D show additional graphic illustrations of examples of hand gestures that may be tracked.
Figure 7B:
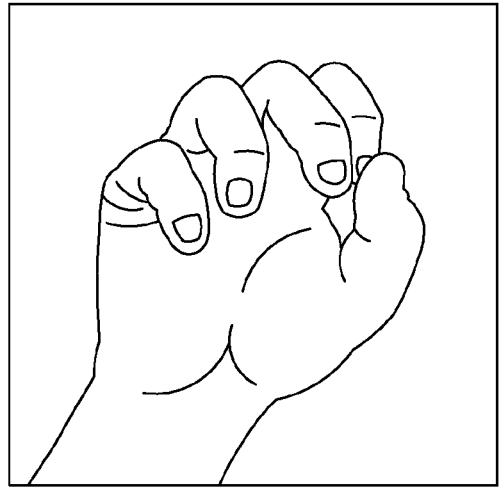
Figure 7C:
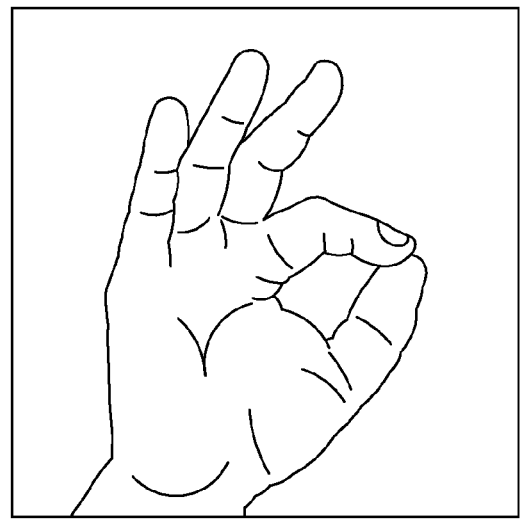
Figure 7D:
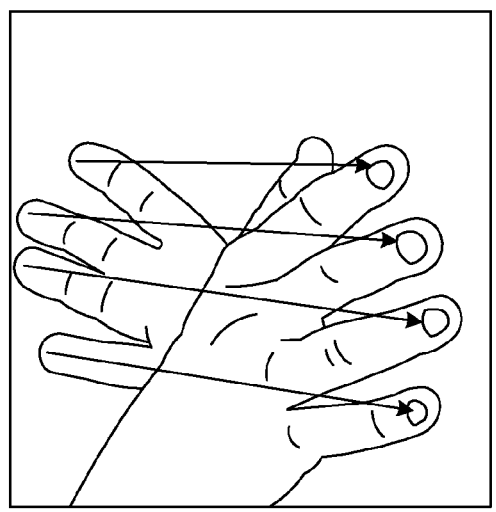

FIGS. 7A-7D show additional graphic illustrations of examples of hand gestures that may be tracked. FIG. 7A shows a dynamic wave-like gesture; FIG. 7B shows a loosely-closed hand gesture; FIG. 7C shows a hand gesture with the thumb and forefinger touching; and FIG. 7D shows a dynamic swiping gesture.

Figure 8:
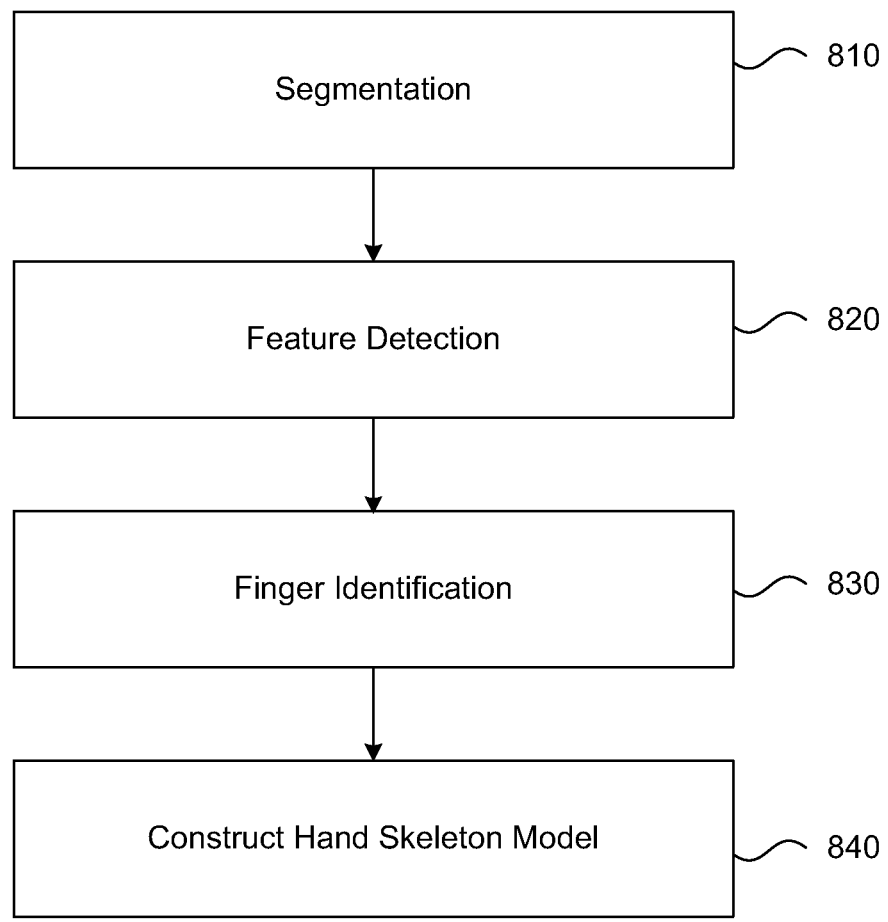
FIG. 8 is a workflow diagram describing an example process of tracking a user's hand(s) and finger(s) over a series of frames of captured images.

FIG. 8 is a workflow diagram describing an example process for tracking a user's hand(s) and finger(s), performed by, for example, a tracking module. The term "blob" refers to a group of contiguous pixels. At stage 810, a blob of pixels corresponding to one of the user's hands is segmented out from the rest of the depth image. If both of the user's hands are present in the depth image, then a blob of pixels for each of the hands is segmented out from the depth image. In some embodiments, candidate blobs are detected by forming groups of pixels in close proximity to one another, and a classifier is applied to each blob. The classifier indicates whether the shape and other features of the blob correspond to a hand. (The classifier is trained offline on a large number of individual samples of hand blob data.) In some embodiments, hand blobs from previous frames are also considered, to indicate whether a blob corresponds to a hand. In some embodiments, the hand's contour is tracked from previous frames and matched to the contour of each blob from the current frame. Once the hand blob is found, all other pixels of the foreground are discarded.

Subsequently, at stage 820, features are detected in the segmented out depth image data and associated amplitude data and/or associated RGB images. These features may be, in some embodiments, the tips of the fingers, the points where the bases of the fingers meet the palm, and any other image data that is detectable. The features detected at stage 820 are then used to identify the individual fingers in the image data at stage 830.

At stage 840, the 30 points of the fingertips and some of the joints of the fingers may be used to construct a hand skeleton model. The skeleton model may be used to further improve the quality of the tracking and assign positions to joints which were not detected in the earlier stages, either because of occlusions, or missed features, or from parts of the hand being out of the camera's field-of-view. Moreover, a kinematic model may be applied as part of the skeleton, to add further information that improves the tracking results. U.S. patent application Ser. No. 13/768,835, entitled "Model-Based Multi-Hypothesis Target Tracker," filed Feb. 15, 2013, describes a system for tracking hand and finger configurations based on data captured by a depth camera, and is hereby incorporated in its entirety.

Figure 9:
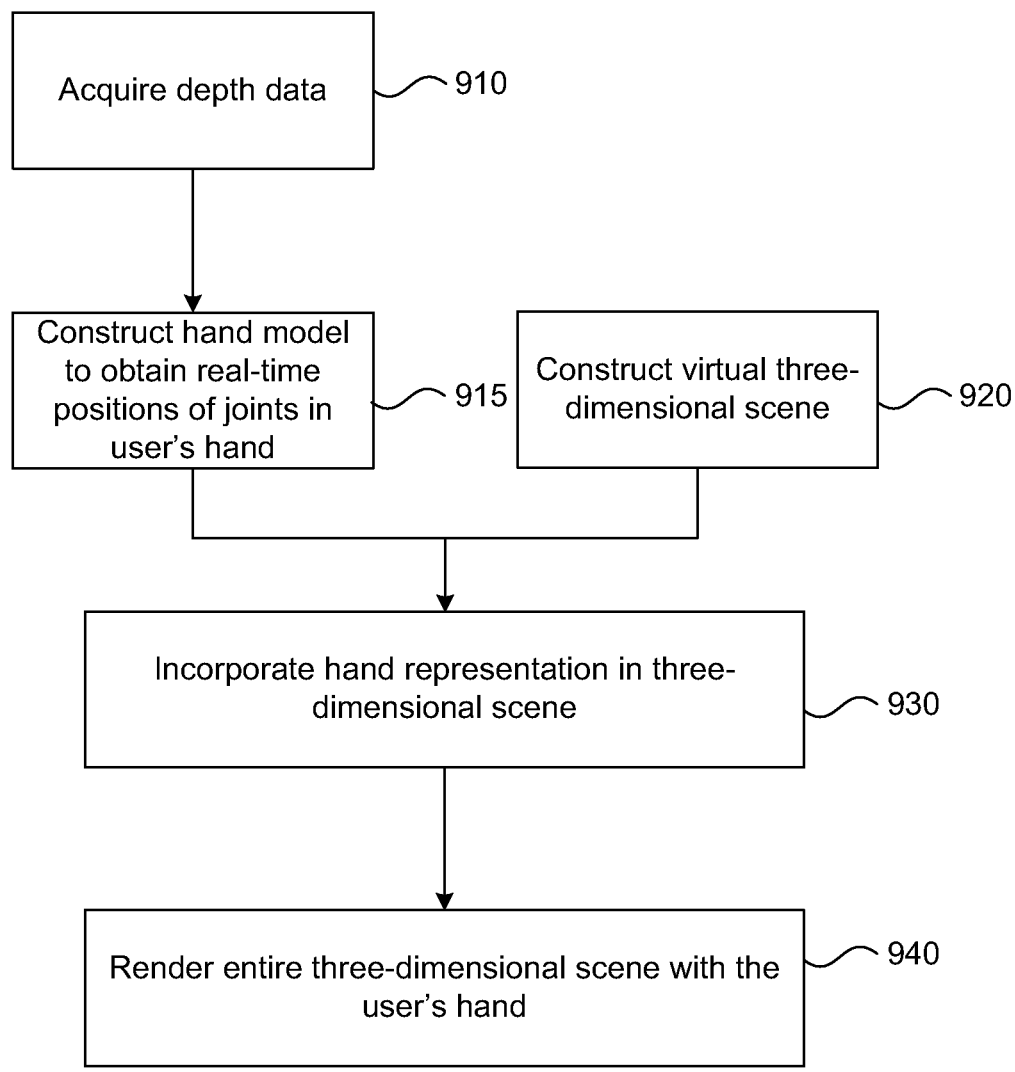
FIG. 9 is a workflow diagram showing an example process for displaying a hand within a three-dimensional scene.

Refer to FIG. 9, which is a workflow diagram showing an example process for displaying a hand within a 30 scene. At stage 910, a depth camera obtains depth data of the scene. Then at stage 915, a tracking module uses the depth data to construct a model or representation of the hand by processing the depth data stream to obtain real-time positions of all of the joints of the user's hand. In parallel, the virtual objects to be displayed to the user on the 30 display are constructed as a 30 scene at stage 920. Subsequently, at stage 930, the output of the tracking module, the 30 representation of the user's hand, is inserted into the constructed 30 scene.

Finally, at stage 940, the entire scene is rendered to produce the display graphics. With this technique, the user's hand is inserted into the virtual display, and the illusion of 30 is strengthened. Furthermore, in some embodiments, a physical simulation may be used such that if the user's hand collides with a virtual object, the virtual object is pushed aside, behaving as it would in the real world.

The user's hand may also be represented in various ways in the display, so as to orient the user as to the relative location of the hand with respect to the virtual environment and objects. In some embodiments, a silhouette of the user's hand (the hand "blob", as defined above) may be cropped from the depth data stream and rendered directly on the screen. In some embodiments, the hand may be represented as a graphical icon, such as a caricature of a hand. The user's hand may also be mapped to an icon with a different appearance, such as an arrow cursor, or a pointing object. Any of these (or other) hand representations may be modeled and rendered in 30, to take advantage of the 30 display ability.

Figure 10:
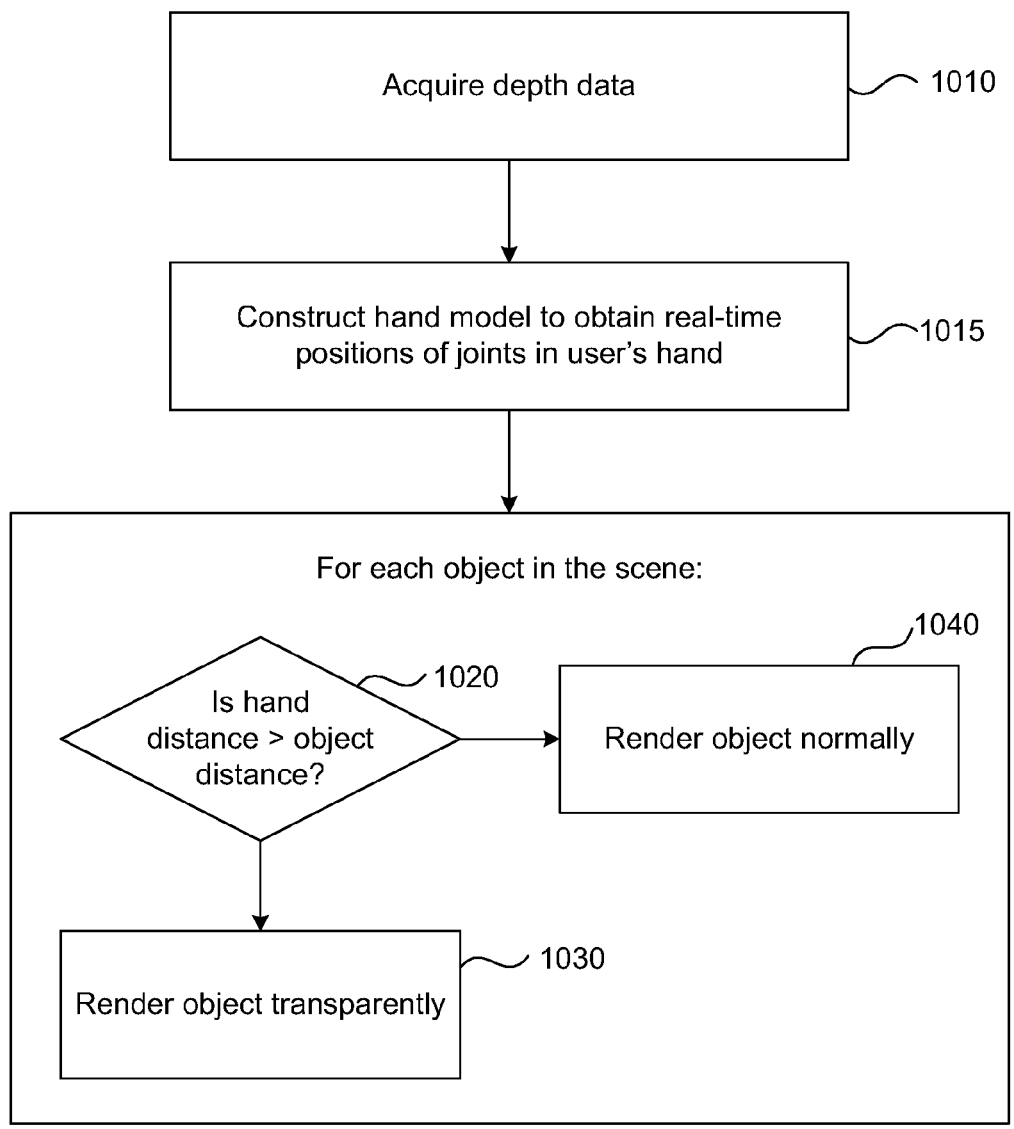
FIG. 10 is a workflow diagram illustrating an example process for using a hand to navigate through a three-dimensional interaction area.

In some embodiments, the user's hand may be moved perpendicularly, towards and away from the display screen, so as to select virtual objects at different depth levels. Depending on the distance of the user's hand from the physical display screen, virtual objects at corresponding depth levels are shown on the display. Refer to FIG. 10, which is a workflow diagram illustrating an example process for using a hand to navigate through a 30 interaction area.

The camera obtains depth data of a scene at stage 1010. Then at stage 1015, the depth data stream is processed, for example, by a tracking module, to construct a hand model that identifies the 30 positions of all of the joints of the user's hand.

Then, each virtual object in the scene to be rendered is tested as follows. At decision block 1020, the system determines if the distance between the user's hand and the physical screen is greater than the average virtual distance between the virtual object and the physical screen, that is, whether the object is closer to the screen than the user's hand as viewed by the user. If the object distance is less than the hand distance to the screen (stage 1020—Yes), at stage 1040, the object is rendered normally in the display. If the object is farther from the screen than the user's hand as viewed by the user (stage 1020—No), then at stage 1030, the object is rendered transparently. Transparent rendering of the object allows the user to see through the object.

At times, the user's hands may block the display screen from the user's view. In some embodiments, the user will be prompted to re-position the hands to the sides of the display screen, so that the hands do not occlude the display from the user's view. Then, when the 30 display presents objects to the user, the user does not actually reach out to touch the object (as would be with a touchscreen). Rather, the user moves his hands outside of the primary interaction space directly between the user and the display, while still staying within the field-of-view of the camera, so as to keep the primary interaction space free, and a cursor (or other representation of the user's hand) moves within the 30 display correspondingly. There may be a one-to-one mapping between the movements of the user's hands/fingers and those of the cursor on the display in the virtual interactive space.

In some embodiments, this method may be used to sort objects. For example, the user's hand is moved to the appropriate depth level to select an object of interest, such as a single page of a document while the user's hand is outside of the primary interaction space. The object may be selected by performing a pre-defined gesture, such as a pinch, or a grab. Once the object has been selected in this way, it moves responsive to the movements of the user's hand. The user may subsequently perform an additional gesture to release the object. Such a release gesture may be a pinch release, or a grab release. In this case, the user's hand movements are mapped to a virtual cursor that indicates which virtual object is selectable. Alternatively or additionally, the user can move a hand to the appropriate depth level to select an object of interest while within the primary interaction space, and the user's hand can be represented by a rendered hand inserted in the virtual scene displayed to the user in the three-dimensional display, as described in FIG. 9.

In particular, a pile of pages may be displayed in 30 to the user, with the top page front-facing the user. As the user's hand moves toward the physical screen, pages progressively become transparent, so that subsequent pages (those behind other pages) become visible. The user may notice a page of interest, select it with a pre-defined gesture, move the hand either backwards or forwards so that the page also moves, and then release the page (with the appropriate gesture) at a different point within the pile. In some embodiments, the user may select a "sub-pile" of pages from the pile, using an index finger and thumb to indicate the beginning and end of the sub-pile. Once the sub-pile is selected, the user may move the selected group of objects to different regions of the environment.

Objects that may be selected and manipulated in such a manner include collections of photos, books, songs, albums, and other types of media. In some embodiments, a web browser's history—that is, the collection of previous websites visited by a user—may be presented in this way, and the user may interact with the history pages accordingly.

A touch screen interaction experience may be extended to depth camera-based gesture control by defining a virtual "invisible wall" as a virtual touch screen that is a fixed distance in front of the physical display screen. If the user's fingers pass through or intersect the invisible wall, dots corresponding to relative locations of the fingertips are displayed on the screen. The user's fingers may then be re-positioned such that the user may interact with graphical elements according to accepted and familiar touch screen user interaction paradigms. In particular, the user may touch an element to launch an application, or change the distance between two fingers to indicate a zooming action ("in" or "out"), or to select an object.

The user is able to see the physical borders of a touch screen, and is therefore able to interact with it naturally. However, with the virtual touch screen simulated with an invisible wall, it may be difficult for the user to determine where the invisible wall begins. In some embodiments, the invisible wall is displayed in the 30 space in front of the 30 display screen, as a semi-transparent virtual wall. Providing the user with this visual cue enables a more natural interaction, since the user is then able to clearly understand how movements are interpreted by the application.

In some embodiments, a collection of pictures may be displayed to the user in 30 space. The user's hands may grab a picture, and move it around in space, in any of three dimensions, and finally releasing the picture when the movement of the picture is complete. The user may also place the picture behind other pictures, in which case the region of the picture occluded by other pictures may not be visible.

In some embodiments, movements of the hands and/or fingers may be used to change the depth-of-field of the scene displayed to the user. The depth-of-field of an image (either 20 or 30) determines which parts of the image are in focus, and which parts are out-of-focus. In some embodiments, the user may position an open hand in front of the display screen, and then move fingers toward the palm. The (30) distance between the fingertips and the center of the palm may be used to set the depth-of-field of the scene. In particular, as the user's fingers are moved toward the center of the palm, and the distance between the fingertips and the palm decreases, the depth-of-field is set to larger values. In some embodiments, the depth-of-field may be set according to the distance of the user's hand or other body part from the display screen, so the user may adjust the depth-of-field by moving a hand closer to and farther from the display screen.

In some embodiments, the 30 values of certain elements may be used to indicate how certain parameters are set, and the user may interact with the elements by pushing them toward the display screen, or pulling them away from the display screen with finger movements. The positions of the joints of the user's fingers are tracked by a tracking module relying on camera depth data. For example, an array of 30 buttons may be used to control a media player. One button may control the volume, another may control the balance, and another may control the treble. The extent to which each button projects out of the display screen into 30 space depends on the specific values of each parameter. The user may change the parameter values with hand movements by pushing buttons towards the display screen or pulling them away from the display screen.

There are different ways for the user to select an object. In some embodiments, the user can simply move the cursor over the object, and leave it there for some pre-determined amount of time. In some embodiments, the user can perform a gesture, such as a "grab" gesture, in which the user's performs finger movements toward the center of the hand, as if grabbing the virtual object. Similarly, the user can "de-select" an object, by performing a pre-determined gesture such as "release", in which the user's fingers are spread away from the palm. Alternatively, other specific gestures can be defined to accomplish these tasks ("select", "de-select"), as well.

In some embodiments, the described techniques may be combined with an additional tracking module that processes the data from a depth camera, or from an RGB camera, to track the location and orientation of the user's head. Then, the user can take advantage of the 30 display by with head movements to change the perspective of the user's view. For example, if an object is occluded by another object which is closer to the user as presented in the 30 display, the user may move his head to see around the occluding object.

Figure 11:
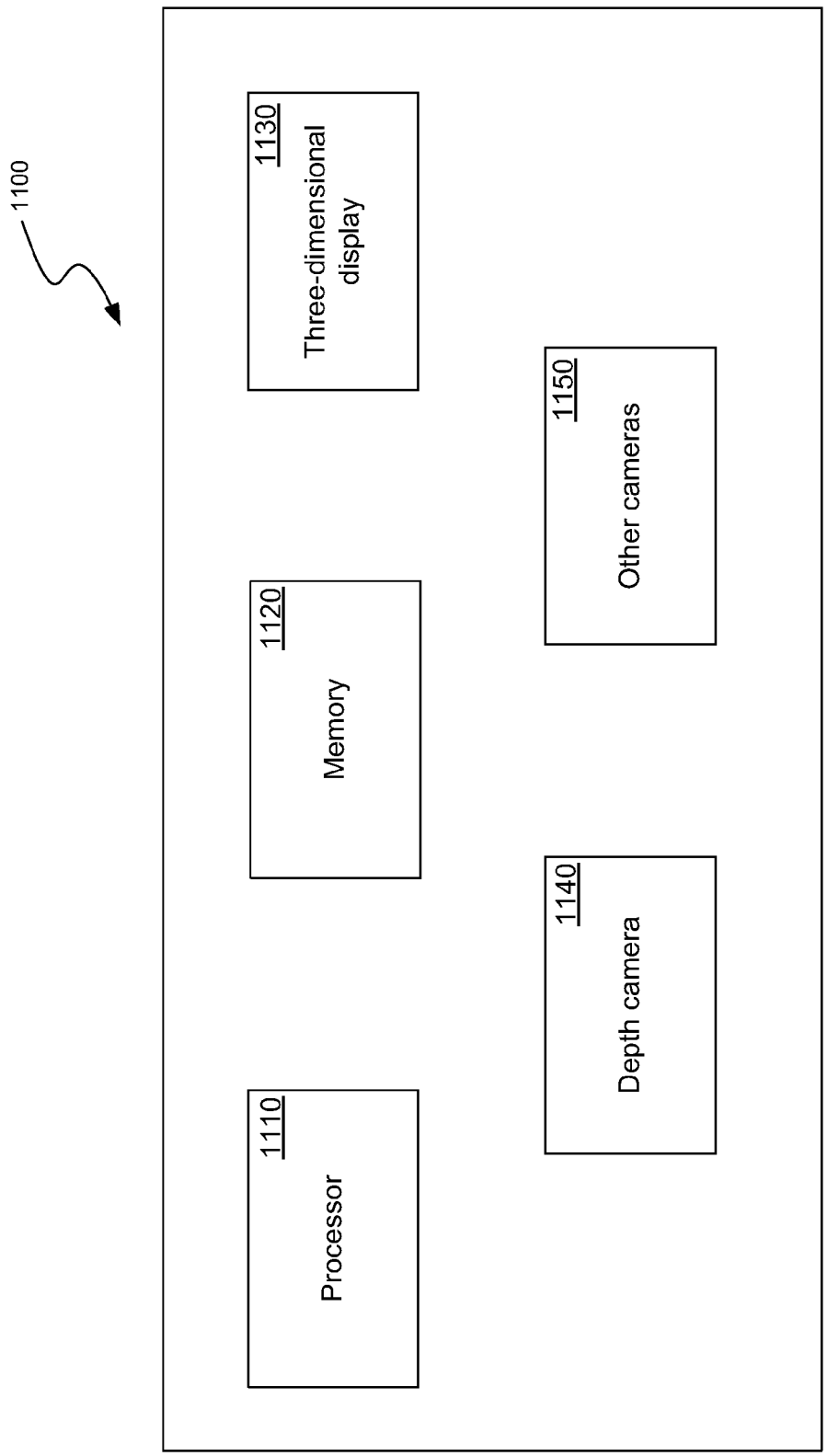
FIG. 11 is a block diagram of a system used to acquire depth data about user movements, interpret the depth data, and provide feedback of the user's movements with respect to virtual objects in a three-dimensional display.

FIG. 11 shows a block diagram 1100 of a system used to acquire depth data about user movements, interpret the depth data, and provide feedback of the user's movements with respect to virtual objects in a three-dimensional display. The system may include one or more processors 1110, memory units 1120, three-dimensional display 1130, depth camera 1140, and, optionally, other camera(s) 1150.

A depth camera 1140 captures a sequence of depth images of a subject or one or more portions of the subject's body, such as one or both hands and/or the head. The other camera(s) 1150 can also capture a sequence of images of the subject or one or more portions of the subject's body, but the camera may be a different type of camera, such as a two-dimensional camera, and RGB camera, and/or infrared camera.

A processor 1110 may be used to run algorithms for processing the data acquired by the depth camera 1140 and any other camera 1150. The processor 1210 can also provide feedback to the user, for example on the three-dimensional display 1130. Memory 1120 may include but is not limited to, RAM, ROM, and any combination of volatile and non-volatile memory.

Figure 12:
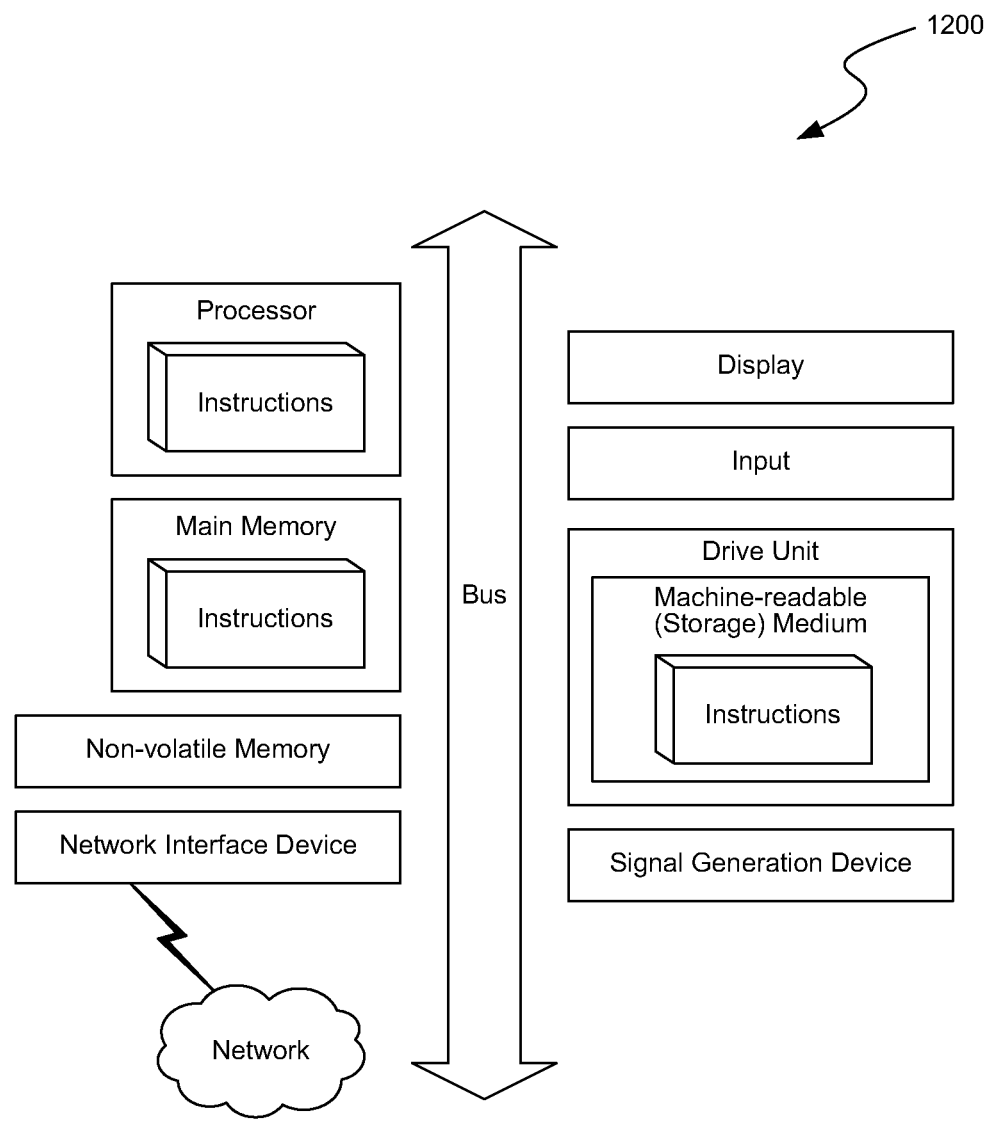
FIG. 12 is a block diagram showing an example of the architecture for a processing system that can be utilized to implement tracking techniques according to an embodiment of the present disclosure.

FIG. 12 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference in their entireties. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

The invention claimed is:

1. A method comprising:
acquiring depth data of a subject with a depth sensor, including acquiring depth data of at least one hand of the subject;
tracking movements of the subject using the acquired depth data, including:
applying a classifier to the acquired depth data to segment a group of pixels corresponding to the subject from the acquired depth data to form segmented depth data;
identifying a plurality of features of the subject in segmented depth data; obtaining three-dimensional positions corresponding to the identified plurality of features from segmented depth data;
constructing a three-dimensional model of the plurality of features from the three-dimensional positions, the three-dimensional model representing the at least one hand of the subject; and
constructing a three-dimensional scene including a plurality of virtual objects;
inserting the three-dimensional model representing the at least one hand of the subject into a first virtual object of the plurality of virtual objects in the three-dimensional scene;
for each of the remaining virtual objects of the plurality of virtual objects, dynamically displaying a remaining virtual object based on movements of the at least one hand of the subject as reflected in the three-dimensional model inserted into the first virtual object, including:
determining whether the remaining virtual object is closer to or further from the screen than the first virtual object;
non-transparently rendering the remaining virtual object when closer to the screen;
transparently rendering the remaining virtual object when further from the screen, wherein transparently rendering the remaining virtual object allows the subject to see through the remaining virtual object.

2. The method of claim 1, wherein the first virtual object into which is inserted the three-dimensional model representing the at least one hand of the subject occludes the second virtual object in the three-dimensional display as a result of tracking the movements of the subject.

3. The method of claim 1, wherein tracking the movements of the subject further comprises classifying the movements of the subject by qualitatively comparing the movements of the at least one hand of the subject to known gestures.

4. The method of claim 1, wherein the identified plurality of features are a plurality of joints of the at least one hand of the subject.

5. The method of claim 1, further comprising changing a depth of field of the three-dimensional display based on a distance of a tracked body part of the subject from a screen of the three-dimensional display, the tracked body part including the at least one hand of the subject.

6. The method of claim 1, further comprising changing a depth of field of the three-dimensional display based on a distance between fingertips of a tracked hand of the subject from a palm of the tracked hand.

7. The method of claim 1, further comprising causing to be displayed a user interface element as a projection from the screen toward the subject in the three-dimensional display, wherein a perceived distance between the subject and the projection of the user interface element is set based on a value of a parameter associated with the user interface element.

8. The method of claim 7, further comprising:
causing to be displayed in a three-dimensional display an interaction between the first virtual object and the projection of the user interface element;
changing the parameter associated with the user interface element in a first direction when the interaction corresponds to the at least one hand of the subject pushing the user interface element; and
changing the parameter associated with the user interface element in a second direction opposite to the first direction when the interaction corresponds to the at least one hand of the subject pulling the user interface element.

9. A system comprising:
a depth camera containing a depth image sensor, the depth image camera configured to acquire a sequence of depth images of one or more body parts of a subject, including acquiring depth data of at least one hand of the subject;
a processor coupled to the depth camera, the processor configured to track movements of the one or more body parts in the sequence of depth images, including applying a classifier to the acquired depth data to segment a group of pixels corresponding to the subject from the acquired depth data to form segmented depth data, identifying a plurality of features of the subject in segmented depth data, obtaining three-dimensional positions corresponding to the identified plurality of features from segmented depth data and constructing a three-dimensional model of the plurality of features from the three-dimensional positions, constructing a three-dimensional scene including plurality of virtual objects, inserting the three-dimensional model into the three-dimensional scene and determine whether a distance between the subject and a screen is greater than an average virtual distance between a virtual object and the screen, determining that a distance between the at least one hand of the subject and the screen is greater than an average virtual distance between a second virtual object and the screen; and
a display coupled to the processor, the display configured to display feedback images capable of being perceived as a three-dimensional display to the subject, wherein the feedback images include a first virtual object animated with movements corresponding to the tracked movements of the one or more body parts, and further wherein the feedback images include the second virtual object with which the subject can interact,
wherein the second virtual object is dynamically displayed in the feedback images based on the animated movements of the first virtual object, including determining whether the second virtual object is closer to or further from the screen than the first virtual object, non-transparently rendering the second virtual object when closer to the screen, and transparently rendering the second virtual object when further from the screen, wherein transparently rendering the second virtual object allows the subject to see through the second virtual object.

10. The system of claim 9, wherein the first virtual object into which is inserted the three-dimensional model representing the one or more body parts occludes the second virtual object in the three-dimensional display as a result of tracking the movements of the subject.

11. The system of claim 9, wherein the one or more body parts are one or more joints of the at least one hand of the subject, and tracking the movements of the subject further comprises classifying the movements of the subject by qualitatively comparing movements of the one or more body parts to known hand gestures.

12. The system of claim 9, wherein the identified plurality of features are a plurality of joints of the at least one hand of the subject.

13. The system of claim 9, the processor further configured to change a depth of field of the display based on a distance of a tracked body part of the subject from the screen of the display, the tracked body part including the at least one hand of the subject.

14. The system of claim 9, the processor further configured to change a depth of field of the display based on a distance between fingertips of a tracked hand of the subject from a palm of the tracked hand.

15. The system of claim 9, the processor further configured to cause to be displayed a user interface element as a projection from the screen toward the subject in the display, wherein a perceived distance between the subject and the projection of the user interface element is set based on a value of a parameter associated with the user interface element.

16. The system of claim 9, the processor further configured to:
cause to be displayed in the display an interaction between the first virtual object and a projection of the user interface element;
change the parameter associated with the user interface element in a first direction when the interaction corresponds to the at least one hand of the subject pushing the user interface element; and
change the parameter associated with the user interface element in a second direction opposite to the first direction when the interaction corresponds to the at least one hand of the subject pulling the user interface element.

17. A non-transitory computer readable medium having instructions which, when executed by a processor, cause the processor to perform operations comprising:
acquire depth data of a subject with a depth sensor, including acquiring depth data of at least one hand of the subject;
track movements of the subject using the acquired depth data, including:
applying a classifier to the acquired depth data to segment a group of pixels corresponding to the subject from the acquired depth data to form segmented depth data,
identifying a plurality of features of the subject in segmented depth data;
obtaining three-dimensional positions corresponding to the identified plurality of features from segmented depth data,
constructing a three-dimensional model of the plurality of features from the three-dimensional positions, the three-dimensional model representing the at least one hand of the subject, and construct a three-dimensional scene including a plurality of virtual objects;

insert the three-dimensional model representing the at least one hand of the subject into a first virtual object of the plurality of virtual objects in the three-dimensional scene;

for each of the remaining virtual objects of the plurality of virtual objects, dynamically display a remaining virtual object based on movements of the at least one hand of the subject as reflected in the three-dimensional model inserted into the first virtual object, including:

determine whether the remaining virtual object is closer to or further from the screen than the first virtual object;

non-transparently render the remaining virtual object when closer to the screen;

transparently render the remaining virtual object when further from the screen, wherein to transparently render the remaining virtual object allows the subject to see through the remaining virtual object.

* * * * *